United States Patent
Meyer

(10) Patent No.: US 9,123,195 B2
(45) Date of Patent: Sep. 1, 2015

(54) MODULAR, MULTI-ORIENTATION CONVEYOR

(75) Inventor: William A. Meyer, Wexford, PA (US)

(73) Assignee: Aesynt Incorporated, Cranberry, PA (US)

( * ) Notice: Subject to any disclaimer, the term of this patent is extended or adjusted under 35 U.S.C. 154(b) by 0 days.

(21) Appl. No.: 13/537,384

(22) Filed: Jun. 29, 2012

(65) Prior Publication Data

US 2014/0001012 A1    Jan. 2, 2014

(51) Int. Cl.
    B65G 17/36     (2006.01)
    G07F 17/00     (2006.01)
    G07F 11/42     (2006.01)
    B65G 17/10     (2006.01)

(52) U.S. Cl.
    CPC ............ *G07F 17/0092* (2013.01); *G07F 11/42* (2013.01); *B65G 17/10* (2013.01)

(58) Field of Classification Search
    CPC ......... G07F 11/52; G07F 11/46; G07F 11/60; G07F 11/62; G07F 11/42; G07F 19/0092; B65G 17/10
    USPC .............................. 198/705, 707, 712; 221/95
    See application file for complete search history.

(56) References Cited

U.S. PATENT DOCUMENTS

| | | | |
|---|---|---|---|
| 1,429,518 A * | 9/1922 | McMahon | 198/707 |
| 3,044,604 A * | 7/1962 | Steigleder | 198/845 |
| 4,154,333 A * | 5/1979 | Lapeyre | 198/707 |
| 4,717,042 A | 1/1988 | McLaughlin | |
| 4,785,969 A | 11/1988 | McLaughlin | |
| 4,847,764 A | 7/1989 | Halvorson | |
| 4,877,121 A * | 10/1989 | Yamashita et al. | 198/475.1 |
| 4,982,556 A * | 1/1991 | Tisma | 53/506 |
| 5,014,875 A | 5/1991 | McLaughlin et al. | |
| 5,190,185 A | 3/1993 | Blechl | |
| 5,255,493 A * | 10/1993 | Molison et al. | 53/473 |
| 5,314,243 A | 5/1994 | McDonald et al. | |
| 5,346,297 A | 9/1994 | Colson, Jr. et al. | |
| 5,377,864 A | 1/1995 | Blechl et al. | |
| 5,393,039 A * | 2/1995 | Smith | 266/261 |
| 5,405,048 A | 4/1995 | Rogers et al. | |
| 5,431,299 A * | 7/1995 | Brewer et al. | 221/2 |
| 5,460,294 A | 10/1995 | Williams | |
| 5,468,110 A | 11/1995 | McDonald et al. | |
| 5,480,062 A | 1/1996 | Rogers et al. | |
| 5,520,450 A | 5/1996 | Colson, Jr. et al. | |
| 5,526,921 A * | 6/1996 | Kovalak et al. | 198/706 |
| 5,564,803 A | 10/1996 | McDonald et al. | |
| 5,593,267 A | 1/1997 | McDonald et al. | |
| 5,661,978 A | 9/1997 | Holmes et al. | |

(Continued)

*Primary Examiner* — Gene Crawford
*Assistant Examiner* — Thomas Randazzo
(74) *Attorney, Agent, or Firm* — Alston & Bird LLP

(57) ABSTRACT

Embodiments of the invention may provide a modular conveyor that includes a conveyor frame including an access opening, a plurality of conveyor buckets configured to move along a continuous path within the conveyor frame, and an access station where the contents of a conveyor bucket disposed at the access station may be accessible through the access opening. Each of the plurality of conveyor buckets may be configured to be substantially enclosed by the conveyor frame when not at the access station. The conveyor frame may include at least one channel disposed about a perimeter of the continuous path, where each of the plurality of conveyor buckets include at least one projection configured to engage the at least one channel. The conveyor buckets may be driven along the continuous path by a drive mechanism disposed outside of the conveyor frame.

18 Claims, 6 Drawing Sheets

(56) References Cited

U.S. PATENT DOCUMENTS

| | | |
|---|---|---|
| D384,578 S | 10/1997 | Wangu et al. |
| 5,713,485 A | 2/1998 | Liff et al. |
| 5,716,114 A | 2/1998 | Holmes et al. |
| 5,745,366 A | 4/1998 | Higham et al. |
| 5,761,877 A | 6/1998 | Quandt |
| 5,797,515 A | 8/1998 | Liff et al. |
| 5,805,456 A | 9/1998 | Higham et al. |
| 5,842,976 A | 12/1998 | Williamson |
| 5,878,885 A | 3/1999 | Wangu et al. |
| 5,880,443 A | 3/1999 | McDonald et al. |
| 5,883,806 A | 3/1999 | Meador et al. |
| 5,893,697 A | 4/1999 | Zini et al. |
| 5,905,653 A | 5/1999 | Higham et al. |
| 5,912,818 A | 6/1999 | McGrady et al. |
| 5,927,540 A | 7/1999 | Godlewski |
| 5,938,072 A * | 8/1999 | Lamoureux et al. .......... 221/253 |
| 5,940,306 A | 8/1999 | Gardner et al. |
| 5,971,593 A | 10/1999 | McGrady |
| 6,003,006 A | 12/1999 | Colella et al. |
| 6,011,999 A | 1/2000 | Holmes |
| 6,021,392 A | 2/2000 | Lester et al. |
| 6,039,467 A | 3/2000 | Holmes |
| 6,065,819 A | 5/2000 | Holmes et al. |
| 6,068,156 A | 5/2000 | Liff et al. |
| 6,109,774 A | 8/2000 | Holmes et al. |
| 6,112,502 A | 9/2000 | Frederick et al. |
| 6,116,461 A | 9/2000 | Broadfield et al. |
| 6,151,536 A | 11/2000 | Arnold et al. |
| 6,170,230 B1 | 1/2001 | Chudy et al. |
| 6,176,392 B1 | 1/2001 | William et al. |
| 6,179,160 B1 * | 1/2001 | Alli ................................ 221/82 |
| 6,189,727 B1 | 2/2001 | Shoenfeld |
| 6,223,934 B1 | 5/2001 | Shoenfeld |
| 6,256,967 B1 | 7/2001 | Hebron et al. |
| 6,283,322 B1 | 9/2001 | Liff et al. |
| 6,289,656 B1 | 9/2001 | Wangu et al. |
| 6,330,957 B1 * | 12/2001 | Bell-Greenstreet ............... 221/3 |
| 6,338,007 B1 | 1/2002 | Broadfield et al. |
| 6,339,732 B1 | 1/2002 | Phoon et al. |
| 6,361,263 B1 | 3/2002 | Dewey et al. |
| 6,370,841 B1 | 4/2002 | Chudy et al. |
| 6,449,927 B2 | 9/2002 | Hebron et al. |
| 6,471,042 B1 * | 10/2002 | Van De Dungen et al. ... 198/703 |
| 6,471,089 B2 | 10/2002 | Liff et al. |
| 6,497,342 B2 | 12/2002 | Zhang et al. |
| 6,499,270 B2 | 12/2002 | Peroni et al. |
| 6,532,399 B2 | 3/2003 | Mase |
| 6,564,121 B1 | 5/2003 | Wallace et al. |
| 6,581,798 B2 | 6/2003 | Liff et al. |
| 6,609,047 B1 | 8/2003 | Lipps |
| 6,611,733 B1 | 8/2003 | De La Huerga |
| 6,625,952 B1 | 9/2003 | Chudy et al. |
| 6,640,159 B2 | 10/2003 | Holmes et al. |
| 6,650,964 B2 | 11/2003 | Spano, Jr. et al. |
| 6,671,579 B2 | 12/2003 | Spano, Jr. et al. |
| 6,681,149 B2 | 1/2004 | William et al. |
| 6,742,671 B2 | 6/2004 | Hebron et al. |
| 6,755,931 B2 | 6/2004 | Vollm et al. |
| 6,760,643 B2 | 7/2004 | Lipps |
| 6,775,591 B1 * | 8/2004 | Shoenfeld ...................... 700/243 |
| 6,776,304 B2 | 8/2004 | Liff et al. |
| 6,776,306 B1 | 8/2004 | Michael et al. |
| 6,785,589 B2 | 8/2004 | Eggenberger et al. |
| 6,790,198 B1 | 9/2004 | White et al. |
| 6,814,254 B2 | 11/2004 | Liff et al. |
| 6,814,255 B2 | 11/2004 | Liff et al. |
| 6,847,861 B2 | 1/2005 | Lunak et al. |
| 6,874,684 B1 | 4/2005 | Denenberg et al. |
| 6,892,780 B2 | 5/2005 | Vollm et al. |
| 6,895,304 B2 | 5/2005 | Spano, Jr. et al. |
| 6,975,922 B2 | 12/2005 | Duncan et al. |
| 6,985,797 B2 | 1/2006 | Spano, Jr. et al. |
| 6,996,455 B2 | 2/2006 | Eggenberger et al. |
| 7,010,389 B2 * | 3/2006 | Lunak et al. .................. 700/243 |
| 7,014,063 B2 | 3/2006 | Shows et al. |
| 7,016,766 B2 | 3/2006 | William et al. |
| 7,040,504 B2 | 5/2006 | Broadfield et al. |
| 7,052,097 B2 | 5/2006 | Meek, Jr. et al. |
| 7,072,737 B2 | 7/2006 | Lunak et al. |
| 7,072,855 B1 | 7/2006 | Godlewski et al. |
| 7,077,286 B2 | 7/2006 | Shows et al. |
| 7,085,621 B2 | 8/2006 | Spano, Jr. et al. |
| 7,092,796 B2 | 8/2006 | Vanderveen |
| 7,093,755 B2 * | 8/2006 | Jordan et al. .................. 235/385 |
| 7,100,792 B2 | 9/2006 | Hunter et al. |
| 7,103,419 B2 | 9/2006 | Engleson et al. |
| 7,111,780 B2 | 9/2006 | Broussard et al. |
| 7,139,639 B2 | 11/2006 | Broussard et al. |
| 7,150,724 B2 | 12/2006 | Morris et al. |
| 7,171,277 B2 | 1/2007 | Engleson et al. |
| 7,218,231 B2 | 5/2007 | Higham |
| 7,228,198 B2 | 6/2007 | Vollm et al. |
| 7,249,688 B2 | 7/2007 | Hunter et al. |
| 7,348,884 B2 | 3/2008 | Higham |
| 7,417,729 B2 | 8/2008 | Greenwald |
| 7,419,133 B2 | 9/2008 | Clarke et al. |
| 7,426,425 B2 * | 9/2008 | Meek et al. .................... 700/237 |
| 7,554,449 B2 | 6/2009 | Higham |
| 7,571,024 B2 | 8/2009 | Duncan et al. |
| 7,588,167 B2 | 9/2009 | Hunter et al. |
| 8,588,966 B2 * | 11/2013 | Michael ......................... 700/242 |
| 2002/0047019 A1 * | 4/2002 | Devers ................................ 221/2 |
| 2009/0166371 A1 * | 7/2009 | Dikken ............................. 221/22 |
| 2012/0248947 A1 * | 10/2012 | Kijowski et al. ................ 312/91 |

* cited by examiner

MODULAR, MULTI-ORIENTATION CONVEYOR

TECHNOLOGICAL FIELD

Embodiments of the present invention relate generally to a dispensing and/or conveying apparatus and, more particularly, to a scalable, modular apparatus which can be arranged in multiple orientations, configured to securely store and convey contents.

BACKGROUND

Medication dispensing cabinets have been developed in order to store and controllably dispense a variety of medications. Generally, a medication dispensing cabinet may include a cabinet body with one or more drawers that are slidably disposed within the cabinet body where the drawers are configured to store the various medications.

Some medication dispensing cabinets are automated and, as such, include or are otherwise associated with a computer that controls access to the medications stored within the cabinet. The computer may allow access to only authorized users, such as medical providers who work in the unit in which the medication cabinet is located. Once authorized by the computer, a medical provider may identify a particular medication to be dispensed, such as by reference to the medications prescribed to a respective patient to whom the medical provider is attending. The computer may then facilitate dispensation of the particular medication.

In this regard, a medication dispensing cabinet may include a locked drawer with one or more windows defined by the front face of the drawer through which the dispensed medication may be accessed by the medical provider. The drawer may house a conveyor belt and a plurality of paddles, fins or the like extending outwardly from the conveyor belt. The paddles are generally spaced apart along the conveyor belt so as to define regions between adjacent paddles for receiving medication. By controllably moving the conveyor belt, such as under the direction of the computer associated with the automated medication dispensing cabinet, the medication may be correspondingly moved along a predefined path of movement of the conveyor belt. The path defined by the conveyor belt is generally aligned with a respective window defined by the front face of the drawer. Thus, once the automated medication dispensing cabinet has authorized the medical provider and the dispensation of the medication to the medical provider, the automated medication dispensing cabinet may drive the conveyor belt to move the paddles such that the medication disposed in a respective region between adjacent paddles is presented at the window. The medical provider may then open the window and retrieve the medication. However, the medical provider is limited in regards to the quantity of the medication that may be retrieved since the medical provider is only able to access the quantity of medication, such as a unit dose of medication, disposed within the region between the pair of adjacent paddles that is presented at the window.

In order to move the medication along the path defined by the conveyor belt, the paddles may be curved in the direction of movement of the conveyor belt. In addition, the distal ends of the paddle may be proximate to or may contact the walls of the drawer or other fixed features, such as dividers, partitions or the like within the drawer. During movement of the conveyor belt, the medication may become pinched, wedged, jammed or the like between the paddles and either the floor of the drawer or the walls or other fixed partitions, dividers or the like within the drawer, thereby potentially requiring operator intervention.

Further example embodiments of medication dispensing cabinets may include auger-type dispensing mechanisms similar to those used in snack-food vending machines. However, auger-type dispensing mechanisms may suffer similar deficiencies as those identified with respect to conveyor belt embodiments.

BRIEF SUMMARY

A medication dispensing cabinet and an associated modular conveyor assembly are therefore provided in order to controllably convey and dispense medication. In contrast to medication dispensing cabinets containing drawers and pockets or techniques that pushed medication along a conveyor belt with paddles or the like, the medication dispensing cabinet and associated modular conveyor assembly of embodiments of the present invention carry the medication. As such, the medication dispensing cabinet and the associated modular conveyor assembly of embodiments of the present invention securely contain the medication until the medication is ready to be dispensed. Further, the modular conveyor assembly of embodiments of the present invention may advantageously prevent instances in which the medication may otherwise be pinched, wedged or jammed relative to the conveyor frame.

In one embodiment, a modular conveyor is provided that includes a conveyor frame including an access opening, a plurality of conveyor buckets configured to move along a continuous path within the conveyor frame, and an access station where the contents of a conveyor bucket disposed at the access station may be accessible through the access opening. Each of the plurality of conveyor buckets may be configured to be substantially enclosed by the conveyor frame when not at the access station. The conveyor frame may include at least one channel disposed about a perimeter of the continuous path, where each of the plurality of conveyor buckets include at least one projection configured to engage the at least one channel. The conveyor buckets may be driven along the continuous path by a drive mechanism disposed outside of the conveyor frame. The path may include two straight sections disposed between two radiused sections. A conveyor bucket disposed on a first of the two straight sections may be in an inverted position relative to a conveyor bucket disposed on a second of the two straight sections.

According to some embodiments, each conveyor bucket may define a cavity and an apex proximate a bottom of the cavity. The apex of a first conveyor bucket may be substantially adjacent to the apex of a second conveyor bucket when the first conveyor bucket and the second conveyor bucket are in a radiused section of the conveyor path, and the ape of the first conveyor bucket may not be adjacent to the apex of the second conveyor bucket when the first conveyor bucket and the second conveyor bucket are in a straight section of the conveyor path. The plurality of conveyor buckets may each include a first side and an opposing second side, a first pair of pins extending from the first side, and a second pair of pins extending from the second side. The plurality of buckets may be pivotally connected to one another by links joining one of the first pair of pins and one of the second pair of pins of a first conveyor bucket to one of the first pair of pins and one of the second pair of pins of a second, adjacent conveyor bucket. The conveyor frame may include a first side plate and a second side plate, each including a continuous channel disposed therein, where the pair of pins from the first side of each of the plurality of conveyor buckets may be configured to engage the continuous channel of the first side plate and the pair of pins from the second side of each of the plurality of conveyor buckets may be configured to engage the continuous channel of the second side plate.

Embodiments of the present invention may provide for a modular conveyor including a conveyor frame having a first side plate, a second side plate, a top plate, a bottom plate, an end plate, and an accessible end plate. The modular conveyor may further include a conveyor bucket including a cavity and an open side, where the conveyor bucket may be configured to travel on a conveyor path within the conveyor frame, and where the conveyor frame may be configured to enclose the open side of the conveyor bucket. The open side of the conveyor bucket may include a perimeter, where the perimeter includes at least one projection, and where the conveyor frame includes a channel in which the at least one projection of the conveyor bucket travels as the conveyor bucket travels along the conveyor path. The open side of the conveyor bucket may be accessible from outside the conveyor frame when the conveyor bucket is proximate the accessible end plate.

According to example embodiments, the first side plate and the second side plate may each define a continuous channel, where the conveyor bucket includes pins extending therefrom configured to engage the continuous channels. The first side plate, the second side plate, the top plate, the bottom plate, the end plate, and the accessible end plate cooperate to define a conveyor cavity, where the top plate, the bottom plate, and the end plate each include at least one projection disposed within the conveyor cavity. The conveyor bucket may include a channel proximate the open side and where the projection of the top plate, the bottom plate, and the end plate may be configured to be received by the channel of the conveyor bucket.

Further example embodiments of the invention may provide for a modular conveyor including a conveyor frame having a first side plate including a first continuous channel, a second side plate including a second continuous channel, a top plate, and a bottom plate, where the top plate and the bottom plate include a retention channel. The modular conveyor may further include a conveyor bucket having a first side including a first pair of guide pins extending therefrom, a second side including a second pair of guide pins extending therefrom, a front side including a first retention feature, a back side including a second retention feature, and a cavity defined by the first side, the second side, the front side, and the back side. The first pair of guide pins may be configured to engage the first continuous channel, the second pair of guide pins may be configured to engage the second continuous channel, the first pair of guide pins and the first channel, and the second pair of guide pins and the second channel, cooperate to define a path of travel of the conveyor bucket. The first retention feature and the second retention feature may be configured to engage the retention channel to substantially enclose the cavity of the conveyor bucket as the conveyor bucket travels along the path of travel.

According to some example embodiments, the conveyor bucket may be configured to become inverted as it travels along the path of travel. The first side and the second side of the conveyor bucket may each extend above the cavity, and where the portion of the first side and the second side that extend above the cavity may be configured to be received in a channel disposed between the first side and the top side and the second side and the top side, respectively. The conveyor bucket may be configured to be driven along the path of travel by a mechanism engaging the portion of the first side and/or the second side of the conveyor bucket which extend above the cavity.

BRIEF DESCRIPTION OF THE SEVERAL VIEWS OF THE DRAWINGS

Figure 1:
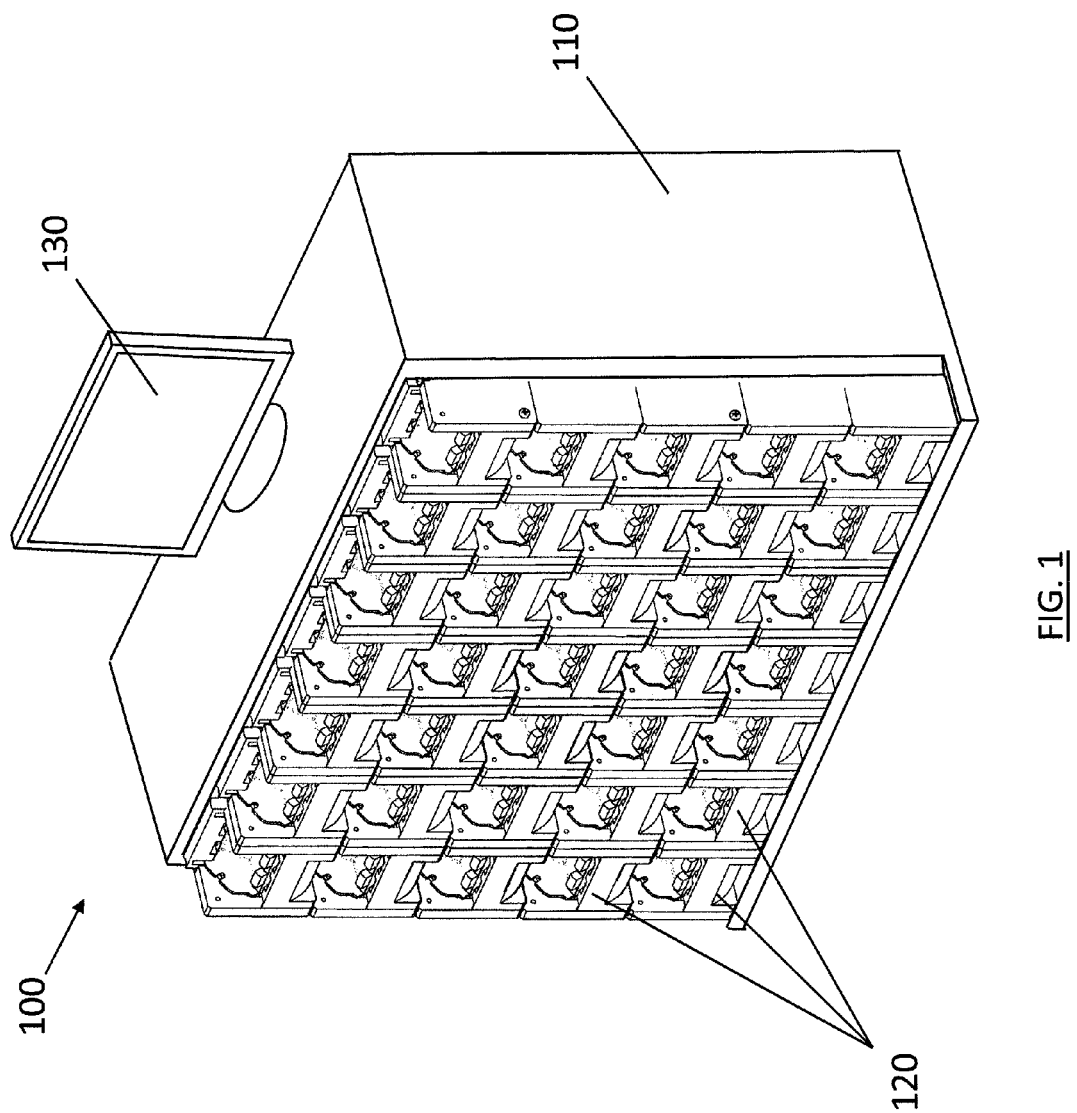
Figure 2:
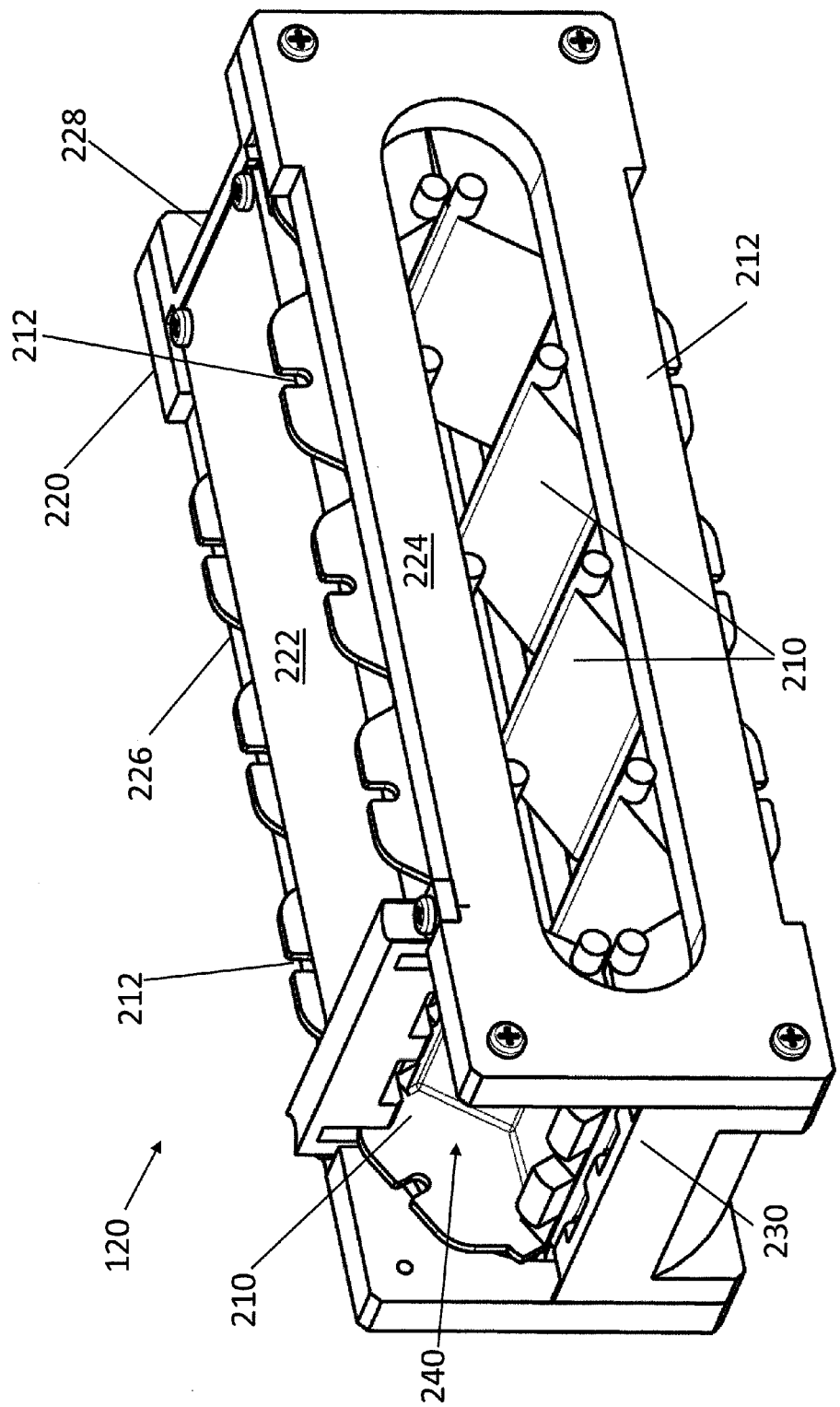
Figure 3:
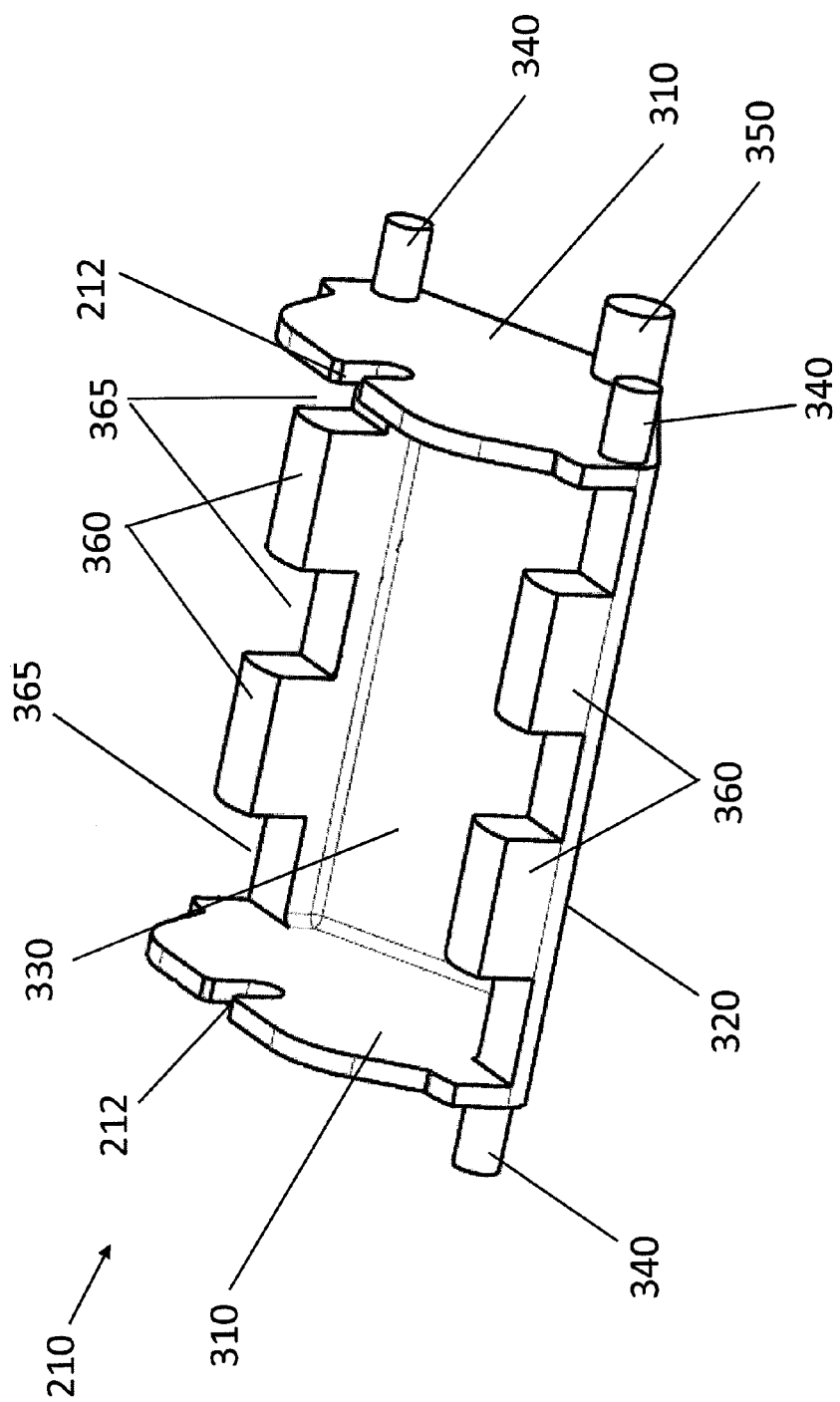
Figure 4:
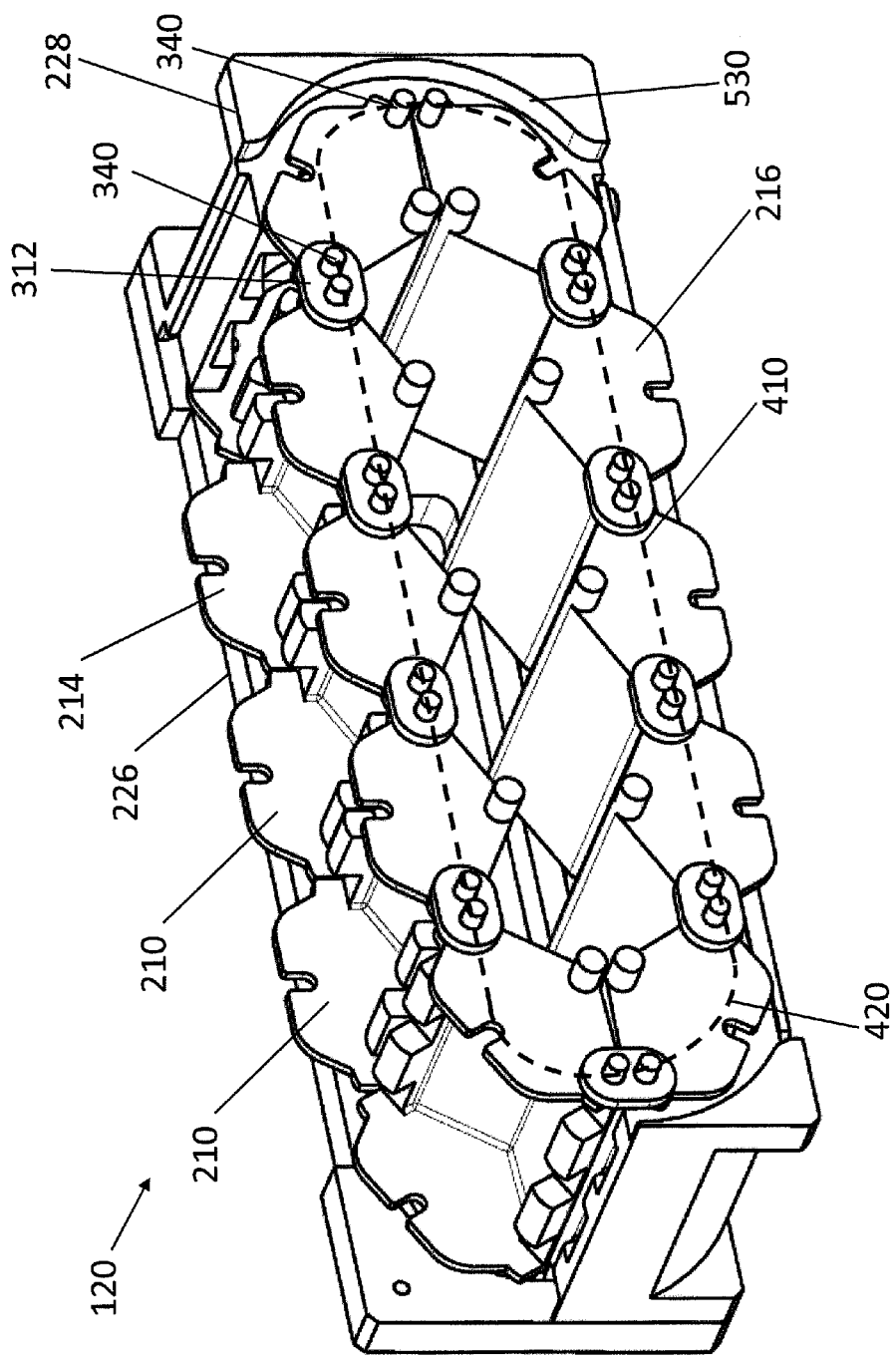
Figure 5:
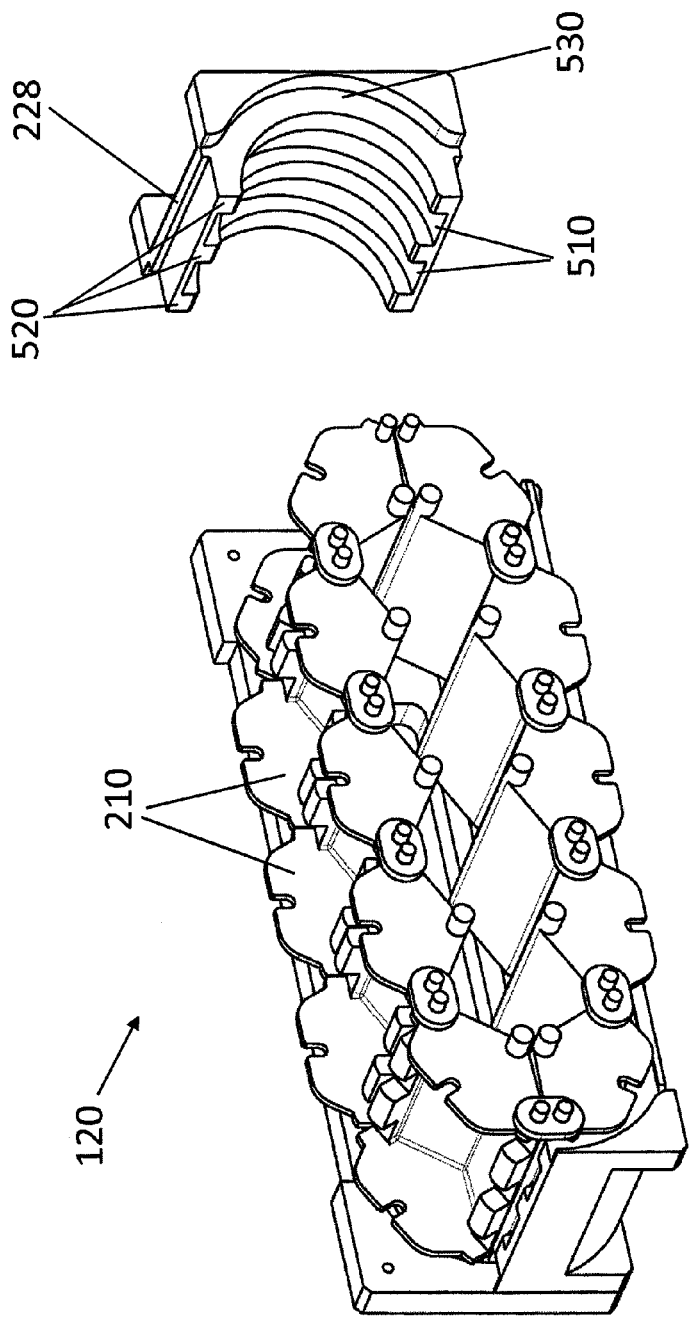
Figure 6:
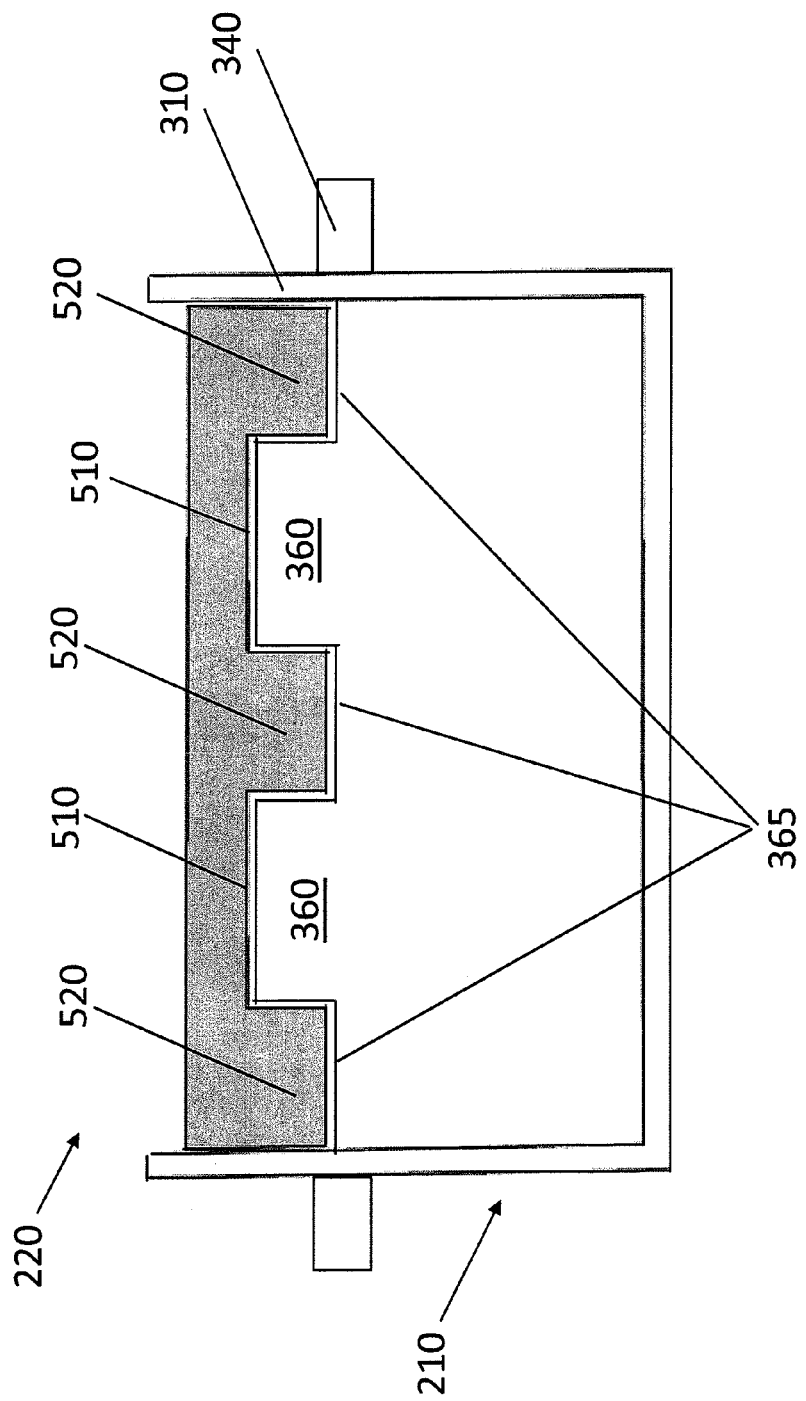

Having thus described embodiments of the invention in general terms, reference will now be made to the accompanying drawings, which are not necessarily drawn to scale, and wherein:

FIG. 1 is a perspective view of a cabinet in accordance with one embodiment of the present invention;

FIG. 2 is a perspective view of a modular conveyor according to one embodiment of the present invention;

FIG. 3 is a perspective view of a conveyor bucket for use in a modular conveyor according to an example embodiment of the present invention;

FIG. 4 is a perspective view of a portion of a modular conveyor according to one embodiment of the present invention;

FIG. 5 is an exploded perspective view of a modular conveyor in accordance with another embodiment of the present invention; and FIG. 6 is a cross-section view of a conveyor bucket engaged with a top plate of a modular conveyor according to an example embodiment of the invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Referring now to FIG. 1, a cabinet 100 for storing a plurality of medications in accordance with one embodiment of the present invention is illustrated. As shown, the cabinet may include the cabinet body 110 defining an internal cavity. The cabinet may further include a plurality of modular conveyors 120 disposed therein. The modular conveyors may store various medications and/or medical supplies and, as described below, may be controlled so as to control access to the medications stored therein. The cabinet of an example embodiment may be automated and, as such, may include a computer, such as a personal computer, workstation, tablet computer, or the like, for controlling access to medications stored by the cabinet. As shown in FIG. 1, the computer may be carried by the cabinet 100 and may include a display 130, a keyboard, touchscreen, pointing device, or the like, and a processing unit (not shown) including or associated with a memory device or the like. Optionally, the computer or at least a portion of the processing unit may be remote from the cabinet body, but may be associated with and in communication with the cabinet body and the drawers so as to control access to the plurality of medications.

In accordance with an embodiment of the present invention, the cabinet may include a plurality of modular conveyors 120. While the illustrated embodiment includes a plurality of modular conveyors that are equal in size, modular conveyors according to the present invention may be scaled to be larger or smaller based upon the size of the articles intended to be dispensed from the modular conveyor. Optionally, the cabinet 100 may be configured with one or more conveyors and one or more drawers or other storage locations for medications or medical supplies. The modular conveyors 120 of example embodiments may be configured to carry and dispense medication, such as individually packaged unit doses, medicine vials, etc. The conveyors may control the dispensing of medication such that controlled movement of the conveyor buckets within the modular conveyors 120 may facilitate the controlled dispensing of the medication. One embodiment of a modular conveyor in accordance with an example embodiment of the present invention is shown in FIG. 2.

Each modular conveyor 120 may include a plurality of conveyor buckets 210 contained within the conveyor frame 220. The conveyor frame 220 may include first and second side plates 224, 226, a top plate 222, an end plate 228, an accessible end plate 230, and a bottom plate (not shown) which substantially resembles the top plate 222. The conveyor buckets 210 may be configured to advance around a conveyor path within the conveyor frame 220. While the terms top, bottom, up, down, left, and right may be used herein to describe embodiments of the present invention, it is appreciated that these terms are used to describe relative positions of components and structures and they are not intended to be limiting. Embodiments of the present invention may be used in a variety of orientations. As such, the terms as used herein describe the invention relative to the figures presented rather than all possible embodiments and orientations.

The plurality of conveyor buckets 210 within the modular conveyor 120 may be advanced along the conveyor path by a drive mechanism. The drive mechanism may be disposed outside of the cavity of the conveyor frame defined by the sides, top plate, and bottom plate of the conveyor frame as will be described further below. The drive mechanism may engage a portion of a conveyor bucket, such as notch 212, and advance the conveyor buckets along the conveyor path.

The conveyor buckets 210 may advance between stations along the conveyor path. For example, an access station may be the location along the conveyor path in which a conveyor bucket is disposed when the cavity of the conveyor bucket 210, and the contents therein, are accessible to a user outside of the conveyor frame 220, through access opening 240. Each incremental movement of the conveyor buckets may position a subsequent conveyor bucket at the access station. In this manner, the drive mechanism may index the conveyor buckets and advance the conveyor buckets the proper number of increments to present the appropriate conveyor bucket to a user at the access station.

An example embodiment of a conveyor bucket is illustrated in FIG. 3. The illustrated conveyor bucket 300 includes sides 310 which each include a pair of pins 340 extending therefrom. Each pair of pins 340 may be configured to engage a continuous channel in a side plate of the conveyor frame as will be described further below. One or both sides 310 of the conveyor bucket may include a drive pin 350 which may be used to drive the conveyor buckets 300 around the conveyor path. Alternatively or additionally, each side may include a notch 212, as noted above, which may be engaged by a drive mechanism disposed outside of the cavity defined by the conveyor frame 220.

The conveyor bucket 300 of the illustrated embodiment may further include a front side 320 and a back side 330. The front side 320 and the back side 330 may be configured to meet at an apex proximate the bottom of the conveyor bucket cavity. The front side 320 and the back side 330 thereby forming a V-shaped bottom of the conveyor bucket, the advantages of which will be described further below. The front side 320 and the back side 330 may further include projections 360 and recesses 365 which may serve as retention features in concert with the conveyor frame 220 as will also be described further below.

The conveyor buckets of the illustrated embodiment are each identically sized; however, in some embodiments, the conveyor buckets may have different shapes and sizes. Further, the conveyor buckets may be sized and shaped, and/or include inserts, that allow them to securely carry a particular type of medication or medication container, such as a vial, syringe, blister pack, etc.

FIG. 4 illustrates the modular conveyor 120 of FIG. 2 with the side plate 224 and the top plate 222 removed for ease of understanding. The illustrated modular conveyor includes a plurality of conveyor buckets 210 arranged about the conveyor path. The conveyor path may be the path through which the conveyor buckets advance and may be defined by the continuous channel of the conveyor frame in which the pins 340 of the conveyor buckets travel. The continuous path of the illustrated embodiment includes two straight sections 410 disposed between two radiused sections 420 as shown by the broken line. As illustrated, the conveyor buckets 210 of example embodiments may be configured to be inverted as they travel along the conveyor path 410, 420. For example, the conveyor bucket 216 on the bottom side of the conveyor frame 220 may be inverted relative to the conveyor bucket 214 on the top side of the conveyor frame 220.

A first conveyor bucket 210 according to embodiments of the present invention may advance adjacent conveyor buckets by means of pushing or pulling them in response to the first conveyor bucket being advanced. The motion may be imparted by a drive mechanism engaging the notch 212 of one or more conveyor buckets, or by a drive mechanism engaging the drive pin 350 of one or more conveyor buckets. Optionally, the conveyor buckets 210 may be fastened together by means of a link 312 configured to engage one of the pair of pins 340 on each of two adjacent conveyor buckets. The link 312 may be pivotally attached to the pins 340 such that adjacent conveyor buckets 210 may move relative to one another pivotally about their connected pins 340. The pivotal connection between adjacent conveyor buckets 210 may be beneficial as conveyor buckets 210 may pivot relative to one another in the radiused sections 420 of the conveyor path.

As illustrated in the embodiment of FIG. 4, as the conveyor buckets 210 pivot relative to one another in the radiused section 420 of the conveyor path, the portion of the conveyor buckets 210 below the pins 340, particularly the front side 320 and back side 330, move toward one another. The degree to which the front side 320 of a first conveyor bucket and the back side 330 of an adjacent conveyor bucket move toward one another is dictated by the size of the conveyor buckets and the radius of the radiused section 420 of the conveyor path. In order to maximize the use of space for a modular conveyor according to example embodiments, it may be desirable to have the smallest radius for the radiused section 420 to minimize the space of the cavity between the buckets on opposing straight sections 410 of the conveyor path.

The V-shaped cavity of the conveyor buckets as defined by the front side 320 and the back side 330 allow the conveyor buckets 210 to follow a conveyor path that has a tight radius turn relative to the size of the conveyor buckets 210. Further, the V-shaped cavity of the conveyor bucket 210 includes fewer corners of the cavity, as opposed to a flat-bottomed conveyor bucket, to make retrieval of objects from the cavity easier.

As illustrated in FIG. 3, the conveyor buckets 210 of example embodiments may include projections 360 extending from the front side 320 and the back side 330. The projections 360, together with recesses 365, may serve as a retaining feature when engaged with complementary channels and ridges disposed within the conveyor frame 220. FIG.

5 illustrates an exploded view of a modular conveyor according to example embodiments in which the top plate and side plate have been omitted, and the end plate 228 has been separated from the modular conveyor 120. As illustrated, the end plate 228 includes channels 510 and ridges 520 which extend about the end plate in a radius that is commensurate with the radiused path that the conveyor buckets 210 follow on the conveyor path. The top plate and the bottom plate include similar channels and ridges that align with those of the end plate 228 as detailed further below. As the conveyor buckets 210 advance along the conveyor path, the two projections 360 of the front side 320 engage the two channels 510 of the end plate 228. The three recesses 365 of the front side 320 receive the three ridges 520 of the end plate.

FIG. 6 illustrates a cross section of an example embodiment of a conveyor bucket 210 engaging the conveyor frame 220. The illustrated portion of the conveyor frame 220 may be a top plate or a bottom plate. When the conveyor bucket 210 of the illustrated embodiment interfaces with the top plate, the sides 310 of the conveyor bucket 210 may extend above the top plate 222, as shown in FIG. 2 This may be facilitated by a gap between the top plate and the side plate. When the conveyor bucket 210 of the illustrated embodiment interfaces with the end plate 228, a channel 530 may be disposed in the end plate 228 to accommodate the sides of the conveyor buckets. The extension of the side plate outside of the conveyor frame enables an external drive mechanism to engage the conveyor bucket 210 through, for example, notches 212.

As shown in FIG. 6, the projections 360 engage channels 510 of the conveyor frame 220. The ridges 520 of the conveyor frame engage the recesses 365 of the conveyor bucket 210. The engagement of the ridges and projections with the recesses and channels substantially encloses the conveyor bucket cavity. The previously open side of the conveyor bucket is covered by the conveyor frame, and the contents of the conveyor bucket are held securely within the cavity.

The engagement of the ridges and projections with the recesses and channels helps to preclude binding of any contents of the conveyor bucket in the gap between the conveyor bucket and the conveyor frame. For example, a blister-pack or individually packaged medication dose may be in a package that includes a flat perimeter. Embodiments of a conveyor lacking the projections and recesses may be more susceptible to the flat perimeter or a flat edge of a package within the conveyor bucket sliding into the gap between the conveyor bucket and the conveyor frame. When an object even partially enters the gap, the conveyor bucket may bind against the conveyor frame, or the conveyor bucket may get jammed within the conveyor frame. The inclusion of the projections 360 and channels 510 disrupt the gap that would otherwise be flat, thereby discouraging flat edges of packaging from entering the gap.

As the conveyor buckets 210 of example embodiments of the present invention rotate through a full 360 degrees during a cycle around the conveyor path, it is important to ensure the contents of each conveyor bucket are secure. By including the projections 360 received by channels 510 of the conveyor frame, the conveyor buckets 210 of example embodiments become substantially enclosed by the conveyor frame 220 upon leaving the access station and remain substantially enclosed by the conveyor frame 220 through a complete cycle of the conveyor path. The term "substantially enclosed" refers to the cavity of the conveyor bucket including no opening that is large enough for any part of the intended contents of the conveyor bucket cavity to pass through. The projections 360 and channels 510 further reduce the size of openings that do exist to preclude the egress of portions of the contents of the conveyor bucket cavities.

Modular conveyors according to the present invention may be used in a cabinet 100 in conjunction with computers, such as the computer with display 130 of FIG. 1, for helping a user to locate and dispense medication. For example, a user may receive a drug order on the computer or manually enter a drug order. The computer may locate the modular conveyor containing the appropriate medication and direct the user to it. The modular conveyors 120 of a cabinet 100 may be configured to present an empty conveyor bucket or include a locking door over a modular conveyor 120 when the medicine contained in the modular conveyor is not intended to be accessed. Upon receiving an order for a particular medication, the conveyor buckets of the appropriate modular conveyor may automatically advanced to present the proper type and quantity of medication to be dispensed.

Modular conveyors according to the present invention may be configured to carry the same medication and dose in each conveyor bucket within a single conveyor frame. However, example embodiments may include conveyor buckets within a single conveyor frame which carry different medications or different quantities from other conveyor buckets. In order to uniquely identify the conveyor buckets to facilitate tracking of the medication carried by the conveyor buckets, each conveyor bucket may be associated with the unique identifier. For example, each conveyor bucket may carry a bar code or other designation that uniquely identifies the respective conveyor bucket. During restocking or replenishment operations, the computer may be provided with information identifying a respective conveyor bucket and the medication that is to be carried thereby. For example, a user may scan a bar code carried by a conveyor bucket and may also scan a bar code carried by or otherwise associated with the medication that is being placed within the conveyor bucket, thereby uniquely identifying the conveyor bucket and also identifying the type and quantity of medication that is placed within the conveyor bucket. Based on this information, the computer can maintain a record of the conveyor buckets and their contents. The computer may also be informed of the sequence of conveyor buckets that are within a conveyor frame and may also be informed of the current location of the conveyor buckets within the conveyor frame so that the computer can determine the position of each conveyor bucket within the conveyor frame and cabinet. The computer may then be able to determine how far to advance the conveyor buckets of a particular modular conveyor to place the proper conveyor bucket at the access opening to present its contents to a user.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A modular conveyor comprising:
   a conveyor frame comprising an access opening;
   a plurality of conveyor buckets, each comprising at least one projection and defining a cavity, configured to move along a continuous path within the conveyor frame, wherein the conveyor frame comprises at least one channel disposed about a perimeter of the continuous path configured to be engaged by each of the at least one projections; and an access station defined proximate the access opening of the conveyor frame where the cavity of a conveyor bucket disposed at the access station is accessible through the access opening in response to the conveyor being disposed at the access station;

wherein the cavity of each of the plurality of conveyor buckets is configured to be independently substantially enclosed by the conveyor frame including no opening large enough for intended contents of the conveyor bucket to pass through in response to the respective conveyor bucket not being at the access station.

2. The modular conveyor of claim 1, wherein the conveyor buckets are driven along the continuous path by a drive mechanism disposed outside of the conveyor frame.

3. The modular conveyor of claim 1, wherein the path comprises two straight sections disposed between two radiused sections.

4. The modular conveyor of claim 3, wherein a conveyor bucket disposed on a first of the two straight sections is in an inverted position relative to a conveyor bucket disposed on a second of the two straight sections.

5. The modular conveyor of claim 3, wherein each conveyor bucket defines a cavity and an apex proximate a bottom of the cavity.

6. The modular conveyor of claim 5, wherein the apex of a first conveyor bucket is substantially adjacent to the apex of a second conveyor bucket when the first conveyor bucket and the second conveyor bucket are in a radiused section of the path, and wherein the apex of the first conveyor bucket is not adjacent the apex of the second conveyor bucket when the first conveyor bucket and the second conveyor bucket are in a straight section of the path.

7. The modular conveyor of claim 1, the plurality of conveyor buckets each comprising:
  a first side and an opposing second side; and
  a first pair of pins extending from the first side, and a second pair of pins extending from the second side.

8. The modular conveyor of claim 7, wherein the plurality of buckets are pivotally connected to one another by links joining one of the first pair and one of the second pair of pins of a first conveyor bucket to one of the first pair and one of the second pair of pins of a second, adjacent conveyor bucket.

9. The modular conveyor of claim 7, wherein the conveyor frame comprises a first side plate and a second side plate, each comprising a continuous channel disposed therein, wherein the pair of pins from the first side of each of the plurality of conveyor buckets are configured to engage the continuous channel of the first side plate and the pair of pins from the second side of each of the plurality of conveyor buckets are configured to engage the continuous channel of the second side plate.

10. A modular conveyor comprising:
  a conveyor frame comprising:
    a first side plate;
    a second side plate;
    a top plate;
    a bottom plate;
    an end plate;
    an accessible end plate;
    a conveyor bucket defining a cavity and comprising an open side;
  wherein the conveyor bucket is configured to travel on a conveyor path within the conveyor frame; wherein the first side plate and the second side plate each define a continuous channel, wherein the conveyor bucket comprises pins extending therefrom configured to engage the continuous channel, and wherein the conveyor frame is configured to cover the open side of the conveyor bucket thereby enclosing the cavity.

11. The modular conveyor of claim 10, wherein the open side of the conveyor bucket comprises a perimeter, wherein the perimeter includes at least one projection, and wherein the conveyor frame comprises a channel in which the at least one projection of the conveyor bucket travels as the conveyor bucket travels along the conveyor path.

12. The modular conveyor of claim 10, wherein the open side of the conveyor bucket is accessible from outside the conveyor frame when the conveyor bucket is proximate the accessible end plate.

13. The modular conveyor of claim 10, wherein the first side plate, second side plate, top plate, bottom plate, end plate, and accessible end plate cooperate to define a conveyor cavity, wherein the top plate, bottom plate, and end plate each comprise at least one projection disposed within the conveyor cavity.

14. The modular conveyor of claim 13, wherein the conveyor bucket comprises a channel proximate the open side and wherein the projection of the top plate, bottom plate, and end plate are configured to be received by the channel of the conveyor bucket.

15. A modular conveyor comprising:
  a conveyor frame comprising:
    a first side plate comprising a first continuous channel;
    a second side plate comprising a second continuous channel;
    a top plate; and
    a bottom plate, wherein the top plate and the bottom plate comprise a retention channel;
  a conveyor bucket, the conveyor bucket comprising:
    a first side comprising a first pair of guide pins extending therefrom;
    a second side comprising a second pair of guide pins extending therefrom;
    a front side comprising a first retention feature;
    a back side comprising a second retention feature; and
    a cavity defined by the first side, the second side, the front side, and the back side;
  wherein the first pair of guide pins is configured to engage the first continuous channel, the second pair of guide pins is configured to engage the second continuous channel,
  wherein the first pair of guide pins and the first channel and the second pair of guide pins and the second channel cooperate to define a path of travel of the conveyor bucket, and
  wherein the first retention feature and the second retention feature are configured to engage the retention channel to substantially enclose the cavity of the conveyor bucket as the conveyor bucket travels along the path of travel.

16. The modular conveyor of claim 15, wherein the conveyor bucket is configured to become inverted as it travels along the path of travel.

17. The modular conveyor of claim 15, wherein the first side and the second side of the conveyor bucket each extend above the cavity, and wherein the portion of the first side and the second side that extend above the cavity are configured to be received in a channel disposed between the first side and the top side and the second side and the top side, respectively.

18. The modular conveyor of claim 17, wherein the conveyor bucket is configured to be driven along the path of travel by a mechanism engaging the portion of the first side and/or the second side of the conveyor bucket which extend above the cavity.

* * * * *